March 17, 1964 H. H. LEVY ET AL 3,125,730

ASYMMETRIC FREE RUNNING OSCILLATOR

Filed Nov. 30, 1959 2 Sheets-Sheet 1

INVENTORS
HAROLD H. LEVY
JOHN M. HOVEY

BY Richard C. Reed

ATTORNEY

ASYMMETRIC FREE RUNNING OSCILLATOR

Filed Nov. 30, 1959 2 Sheets-Sheet 2

INVENTORS
HAROLD H. LEVY
JOHN M. HOVEY

BY *Richard C. Reed*

ATTORNEY

United States Patent Office 3,125,730

Patented Mar. 17, 1964

3,125,730

ASYMMETRIC FREE RUNNING OSCILLATOR

Harold H. Levy, East Columbia Park, Landover, and John M. Hovey, Oxon Hill, Md., assignors to the United States of America as represented by the Secretary of the Navy Filed Nov. 30, 1959, Ser. No. 856,314
1 Claim. (Cl. 331—55)
(Granted under Title 35, U.S. Code (1952), sec. 266)

The invention described herein may be manufactured and used by or for the Government of the United States of America for governmental purposes without the payment of any royalties thereon or therefor.

The present invention relates to mono-stable multivibrators and, more particularly, to mono-stable multivibrators with near zero recovery time.

Those concerned with the development of mono-stable multivibrators have long recognized the need for a mono-stable multivibrator with near zero recovery time. The present invention fulfills this need.

In conventional mono-stable multivibrators, the recovery time is generally one-third or longer of the delay time of such multivibrators. As a result of this delay in recovery, the conventional mono-stable multivibrator is incapable of repeat operation until this delay has taken place. In computer applications, this represents a substantial loss of traffic handling capacity. In any system where pulse techniques are utilized, this recovery delay has long been an unsolved problem.

The present invention substantially removes the dead time in the operation of computers. The input signals can be applied with near zero time spacing between them. The use time of computers is correspondingly greatly increased. In telemetry applications, the circuit of this invention has been successfully used as a commutation device.

It is, therefore, an object of this invention to provide a mono-stable multivibrator with near zero recovery time.

Another object is to provide a mono-stable multivibrator which, in computer operations, greatly reduces the dead time of the computer.

A further object of the invention is the provision of a commutative device for a telemetry system.

With these and other objects in view, as will hereinafter more fully appear, and which will be more particularly pointed out in the appended claim, reference is now made to the following description taken in connection with the accompanying drawings in which:

Briefly, the circuit of this invention is a mono-stable multivibrator in which the recovery time is less than 0.5 microsecond. This is accomplished by combining a bi-stable multivibrator, a variable resistance-capacitance network and a blocking oscillator. In response to an input pulse applied thereto, an output signal from the bi-stable multivibrator is determined. This determined gate pulse is applied to a blocking oscillator to provide an output signal that is fed back to reset the bi-stable multivibrator. The delay time for the mono-stable multivibrator is controlled by the adjustment of the variable resistance-capacitance network. The delay time can also be controlled by the application of a reset trigger from an outside source to a circuit which is coupled to the blocking oscillator. Further, an asymmetric free running oscillator, to be used as a commutator for telemetry devices for example, can be constructed utilizing the principles of this invention wherein each side of the bi-stable multivibrator is connected to a variable resistance-capacitance network and a blocking oscillator, the output of which is fed back to trigger the operation of the bi-stable multivibrator. The asymmetry is accomplished by the different adjustment of the two variable resistance-capacitance networks.

The circuit of this invention includes a transistorized Eccles-Jordan bi-stable multivibrator with input means connected to the base of a first transistor therein. A choke coil is provided in each of the collector circuits intermediate the negative side of a power source and a current limiting resistor connected to the collector of each of the pnp transistors. The positive side of the power source is connected to a common return. Connected to a first junction between the collector of one of the transistors and its corresponding aforesaid current limiting resistor, is a variable resistor which is connected to a second junction to which are connected one end of a capacitance and one end of a unidirectional element. The opposite ends of the last two components are connected to a common return. The unidirectional element is polarized so as to pass current to the common return. Also connected to the second junction is the base of a third pnp transistor which, with its collector connected to a first end of a first winding on a transformer core and its emitter connected to a first end of a second winding on the core, comprise a blocking oscillator. The opposite ends of said windings are connected to opposed terminals of a power source. Connected between the collector of the third transistor and the first winding is a feedback circuit which includes a unidirectional element which is connected to the base of a second transistor in the Eccles-Jordan circuit. Conventional steering circuitry and required current limiting means are employed. Output signals are derived from either of the collector circuits of the Eccles-Jordan circuit.

Figure 4:
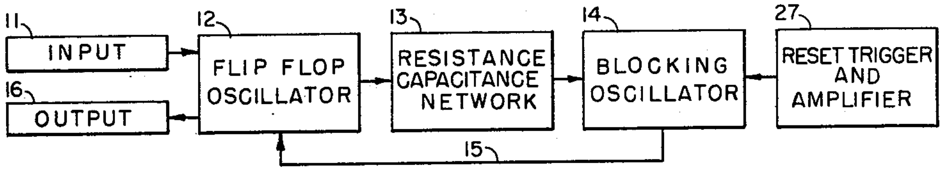
FIG. 4 shows in block diagram another embodiment of the circuit of this invention.

When control of the delay time of the mono-stable multivibrator is desired to be by means of an outside trigger source as shown in FIG. 4, such control is provided by the application of a trigger to the base of an npn transistor, the emitter of which is connected to the common return and the collector is connected to a first end of a third winding on the transformer core. The base of the transistor is shunted to the common return through a resistance and the ends of the third winding are connected through a resistance. The second end of the third winding is connected to the positive side of a power source, the negative side of which is connected to the common return.

Figure 1:
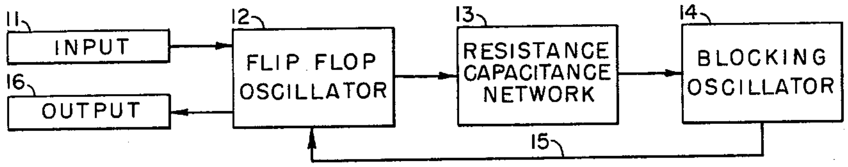
FIG. 1 shows in block diagram an embodiment of the circuit of this invention.
Figure 7:
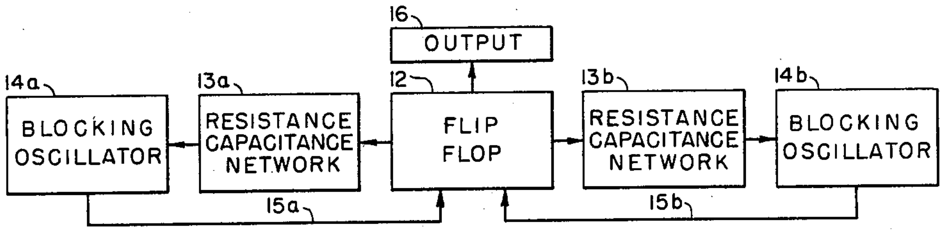
FIG. 7 shows in block diagram an asymmetric free running oscillator constructed in accordance with the principles of the circuit of this invention.

In the asymmetric free running oscillator modification of the circuit of this invention as shown in FIG. 7, the structure is identical with the structure of FIG. 1 except for the provision of a second variable resistance-capacitance network connected to the collector of the second transistor as well as the first network connected to the collector of the first transistor, and a second blocking oscillator connected to the second network in the same manner as the first blocking oscillator is connected to the first network, with feedback circuitry from each of the blocking oscillators connected to the steering circuitry of the Eccles-Jordan circuit.

In the operation of the circuit of this invention, as shown in FIG. 1, input signal source 11 is connected to the Eccles-Jordan flip-flop oscillator 12. The half cycle response of the flip-flop 12 is fed through the resistance capacitance network 13, the time constant of which is variable to control the timing of the triggering of the blocking oscillator 14. When the blocking oscillator is triggered, a pulse is fed back through a connector 15 to trigger the other half-cycle of the operation of the flip-flop 12. This completes the return to the original condition of the circuit in response to a single input pulse that is required in mono-stable multivibrator operation.

Figure 2:
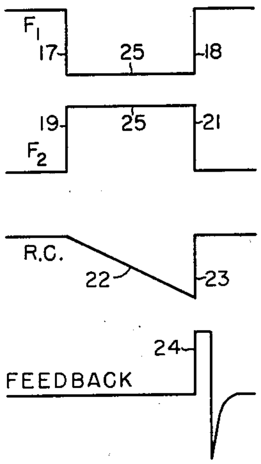
FIG. 2 shows the waveforms for the embodiment of the circuit of this invention shown in FIG. 1 resulting from a first setting of a variable element.

FIG. 2 shows the waveforms in the operation of FIG. 1 when the resistance-capacitance network 13 is adjusted to give a long time-constant. The input pulse 11 is coincident with the leading edges 17 and 19 of the pulses 25 in the collector circuits of the flip-flop circuit taken at junctions 55 and 61, respectively. The gradual slope of the resistance-capacitance delay curve 22 reveals that the delay time has been set to be decidedly delayed. The pulse height 23 indicates the level required to fire the blocking oscillator 14, and such firing provides the feedback pulse 24 to reset the flip-flop oscillator 12 to its original condition, as shown by back edges 18 and 21.

Figure 3:
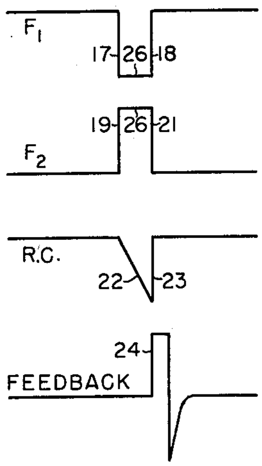
FIG. 3 shows the waveforms as in FIG. 2 resulting from a second setting of a variable element.

FIG. 3 shows the waveforms in the operation of FIG. 1 when the resistance-capacitance network 13 is adjusted to give a short time-constant. It is noted that the pulses 26 are considerably shorter than pulses 25 in FIG. 2, while the pulse heights 17, 19, 23 and 24 are the same. The pulse width 26, which represents the operating time of the mono-stable multivibrator of this invention, can be adjusted to be as little as 0.5 microsecond by proper selection of component values in the resistance-capacitance networks. It is conceivable that 0.1 microsecond can be approached.

Figure 5:
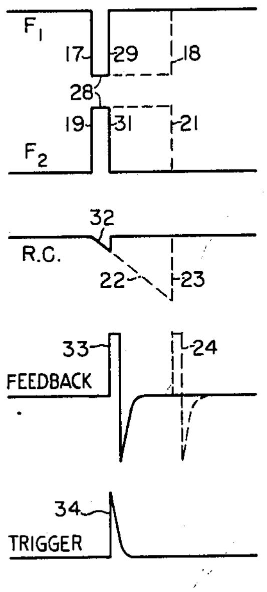
FIG. 5 shows the waveforms for the operation of the circuit of this invention as shown in FIG. 4.

The embodiment of the invention as disclosed in FIG. 4 is identical with the embodiment of FIG. 1 except for the addition of the externally applied reset trigger and amplifier 27 which is connected to the blocking oscillator 14. The reset trigger thus applied is entirely independent from the inherent delays within the mono-stable multivibrator circuitry and has been used successfully to reduce the recovery time to 0.1 microsecond. FIG. 5 shows the waveforms of such operation with the recovery of the mono-stable multivibrator being designated as back edges 29 and 31 of the near zero pulse width 28. The dotted waveforms 18, 21, 22, 23 and 24 are shown to reveal the recovery in the absence of the trigger pulse 34 from the reset trigger and amplifier 27. It is noted that, since the trigger 34 generates the feedback pulse 33 which resets the flip-flop, the resistance-capacitance curve 22 is traversed only the short distance 32 and that the full pulse height 23 is not required for operation of the circuit as in the embodiment of FIG. 1.

Figure 6:
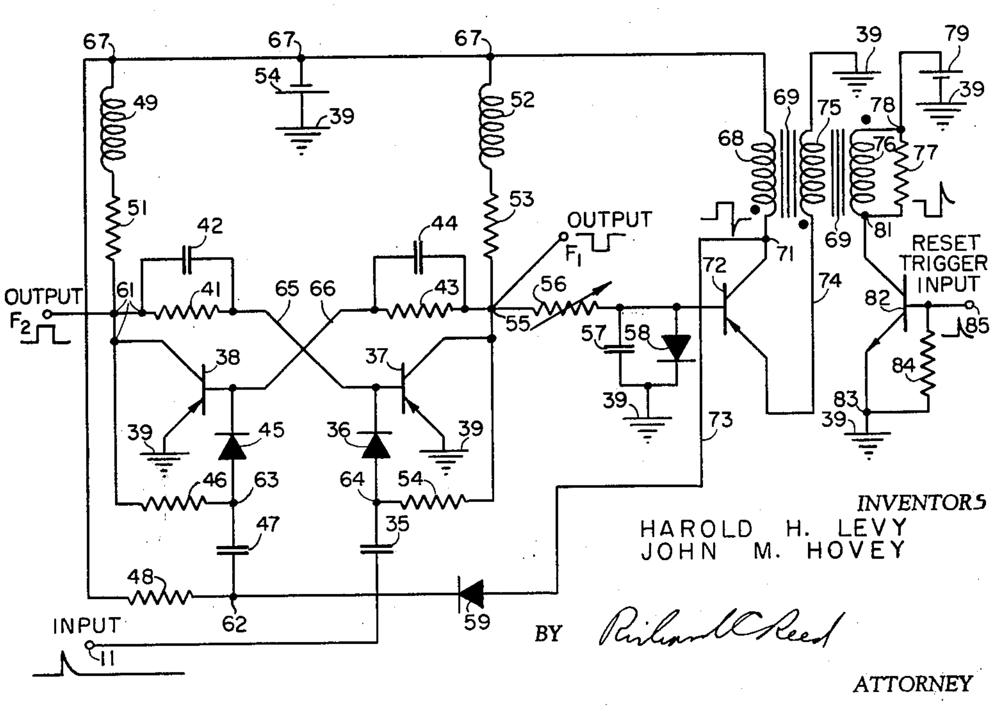
FIG. 6 shows a schematic diagram of the embodiment of the circuit of this invention as shown in FIG. 1 with the modification of such circuitry as shown in FIG. 4.

FIG. 6 shows the details of the circuitry which accomplishes the desired results. The input pulse 11 is applied to the base of a pnp transistor 37 through a steering circuit which includes capacitor 35 and unidirectional element 36 which is polarized so as to pass only the proper polarity to trigger the transistor operation. The familiar Eccles-Jordan operation is sampled in the collector circuit at junction 55 by output $F_1$. Also connected to junction 55 is the variable resistance-capacitance network including the variable resistance 56, capacitance 57 and unidirectional element 58. The polarity of unidirectional element 58 is such that a shunt to the common return is provided during the recovery half cycle of the operation of the flip-flop.

In the operation of the circuit shown in FIG. 7, the blocking oscillators 14*a* and 14*b* are identical as are resistance-capacitance networks 13*a* and 13*b*. When the resistance-capacitance are adjusted symmetrically, a symmetric free running oscillator is provided. Should the two variable resistance-capacitance networks be adjusted to provide different time constants, asymmetry of operation of a free running oscillator is accomplished. This is especially useful when it is desired to commutate telemetered signals that require different lengths of transmission time for intelligible operation.

The circuit as shown in FIG. 6 has been published in Electronic Design on September 2, 1959, pp. 19 and 20 in an article entitled "Building-Block Circuits for Transistorized Digital Computers" by authors including the two instant inventors.

It is seen that we have provided a mono-stable multivibrator with near zero recovery time.

Obviously many modifications and variations of the present invention are possible in the light of the above teachings. It is therefore to be understood that within the scope of the appended claim the invention may be practiced otherwise than as specifically described.

What is claimed is:

In an asymmetric free running oscillator, a transistorized Eccles-Jordan multivibrator including first and second input means connected respectively to separate transistor base terminals thereof and first and second output means connected respectively to separate transistor collector terminals thereof, first and second variable resistance-capacitance networks having third and fourth input means, respectively, and third and fourth output means, respectively, said first output means connected to said third input means and said second output means connected to said fourth input means, and first and second blocking oscillator circuits having fifth and sixth input means, respectively, and fifth and sixth output means, respectively, said third output means connected to said fifth input means, said fourth output means connected to said sixth input means, said fifth output means connected to said first input means and said sixth output means connected to said second input means.

References Cited in the file of this patent

UNITED STATES PATENTS

| | | |
|---|---|---|
| 2,767,313 | Martinelli | Oct. 16, 1956 |
| 2,851,597 | Currie | Sept. 9, 1958 |
| 2,876,348 | Selmer | Mar. 3, 1959 |
| 2,920,196 | O'Brien | Jan. 5, 1960 |
| 2,949,547 | Zimmerman | Aug. 16, 1960 |
| 3,048,708 | Raver | Aug. 7, 1962 |